United States Patent
Wolki et al.

(10) Patent No.: US 6,228,444 B1
(45) Date of Patent: May 8, 2001

(54) METHOD OF MAKING TUBES OUT OF COMPOSITE MATERIAL HAVING HIGH TRIBOLOGICAL AND MECHANICAL CHARACTERISTICS

(75) Inventors: Peter Wolki, Monchengladbach (DE); Emmanuel Edeline, Ecos; Jean-Francois Cretegny, Marly le Roi, both of (FR)

(73) Assignee: Societe Nationale d'Etude et de Construction de Moteurs d'Aviation, Paris (FR)

( * ) Notice: Subject to any disclaimer, the term of this patent is extended or adjusted under 35 U.S.C. 154(b) by 0 days.

(21) Appl. No.: 08/842,620

(22) Filed: Apr. 15, 1997

Related U.S. Application Data

(62) Division of application No. 08/546,017, filed on Oct. 20, 1995, now Pat. No. 5,665,192.

(30) Foreign Application Priority Data

Oct. 21, 1994 (FR) .................................................. 9412587

(51) Int. Cl.[7] .................................................. B32B 29/02
(52) U.S. Cl. ........................ 428/34.4; 428/34.5; 428/34.6; 428/34.7; 428/36.3; 442/289; 442/291; 442/294

(58) Field of Search ..................................... 443/289, 291, 443/294; 428/34.4, 34.5, 34.6, 34.7, 36.3

(56) References Cited

U.S. PATENT DOCUMENTS

| | | | |
|---|---|---|---|
| 3,604,463 | * | 9/1971 | McLarty . |
| 3,888,712 | * | 6/1975 | Akiyoshi et al. . |
| 4,749,752 | * | 6/1988 | Youlu et al. . |

FOREIGN PATENT DOCUMENTS

3442558 * 7/1986 (DE) .

* cited by examiner

*Primary Examiner*—Elizabeth M. Cole
(74) *Attorney, Agent, or Firm*—Weingarten, Schurgin, Gagnebin & Hayes LLP

(57) ABSTRACT

A tubular structure comprising reinforcing fibers impregnated with a thermosetting polymer and a sheet of matrix material filled with an additive suitable for improving tribological and heat conductivity characteristics of the tubular structure. The reinforcing fibers alternate with the matrix material. The tubular structure is formed by winding the reinforcing fiber fabric and the matrix sheet material, wherein the fabric and the matrix sheet material have first and second ends and the first ends are located in the interior of the winding and the second ends are radially outwardly displaced from the first ends.

10 Claims, 3 Drawing Sheets

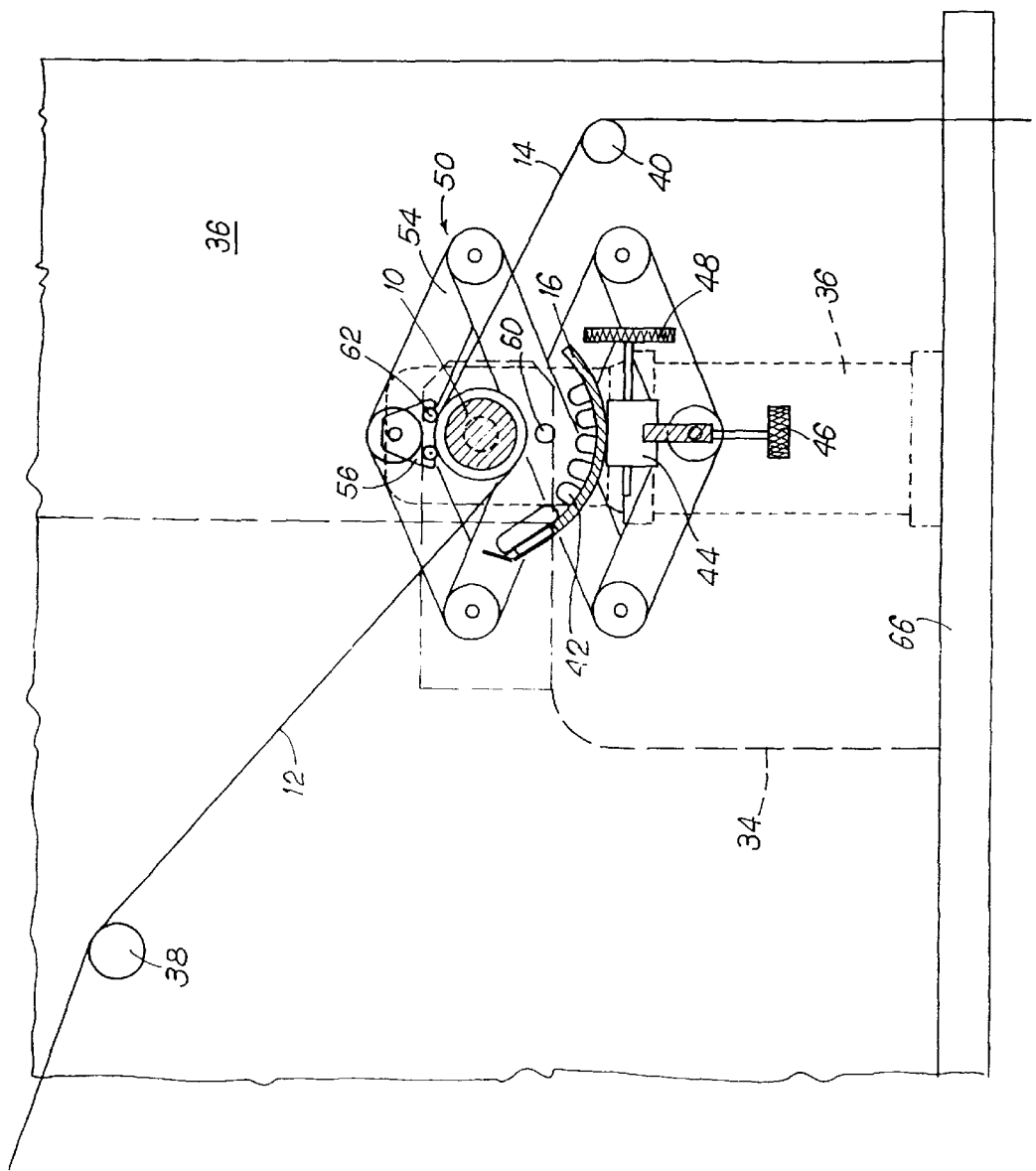

METHOD OF MAKING TUBES OUT OF COMPOSITE MATERIAL HAVING HIGH TRIBOLOGICAL AND MECHANICAL CHARACTERISTICS

This application is a division of Ser. No. 08/546,017, filed Oct. 20, 1995 now U.S. Pat. No. 5,665,192.

The present invention relates to a method of making tubes out of composite material having high tribological and mechanical characteristics, in particular a low coefficient of friction, and particularly intended for manufacturing annular bearings and bearing cages capable of being used at low temperatures (e.g. 20 K to 600 K). The invention also relates to a machine for implementing the method, and to the material obtained thereby.

BACKGROUND OF THE INVENTION

At present, the materials used for making bearing cages do not give entire satisfaction, in particular in cryogenic conditions, and they also suffer from numerous drawbacks associated firstly with mechanical problems that arise at high speeds of rotation and that cause the cage to break, and secondly with the friction between the cage and the balls, rollers, or needles it contains and which are of a kind that can give rise to overheating of the bearing.

A partial solution to these difficulties is provided at present by using composite materials based on glass fiber and on PTFE which are capable, in particular, of operating at high speeds of rotation and which are manufactured mainly on the basis of two conventional methods, namely injection and winding.

The first method suffers from the major drawback of not enabling good mechanical characteristics to be obtained, but it has the advantage of making it easier to add any kind of additive suitable for imparting specific properties to the material made by the method.

The second method which consists in applying a thread to a mandrel that is rotating makes it possible to obtain mechanical characteristics which are good in a circumferential direction because the fibers are oriented, but which are nevertheless poor in a longitudinal direction, thereby having the consequence of limiting the traction strength of bearings made by this method. The weakness of this type of winding persists even when the threads are crossed (using the principle of helical winding) at an optimum angle close to 50°. In addition, the materials obtained by this method suffer from a highly random coefficient of friction that depends, in particular, on the winding directions of the various fibers and that affects both the lifetime and the stability of cages or bearings made with this material. It is also appropriate to observe that the presence of glass fibers imparts abrasive properties to this material which can give rise to certain drawbacks.

Although this simple method of winding applied to sheets of fabric makes it possible to obtain mechanical characteristics that are good in both axial and circumferential directions, it does not enable adequate tribological characteristics of friction and wear resistance to be obtained since it prevents lubricants, are not "impregnatable", being included in significant volume.

OBJECT AND SUMMARY OF THE INVENTION

The present invention therefore proposes a novel method of manufacturing a material that possesses firstly high characteristics in both circumferential and longitudinal directions, and secondly very good tribological characteristics of friction and wear resistance, which is not possible with present methods.

This object is achieved by a method of manufacturing a composite material in the form of an annular tube by winding on a mandrel both a reinforcing fiber fabric and a sheet of matrix material obtained in known manner and available on payout rolls, the method comprising the following steps:

1) preheating the mandrel to a predetermined temperature;
2) fixing the reinforcing fiber fabric and the sheet of matrix material to the mandrel;
3) causing the mandrel to rotate at a nominal speed to wind the fabric and the sheet simultaneously, the fabric and the sheet being subjected to a nominal tension;
4) actuating heating means for heating the material and cooling means for cooling the mandrel;
5) when the tube reaches the desired diameter, stopping both the heating means and the rotation of the mandrel;
6) after a determined duration that is sufficient for bringing the temperature of the mandrel to the predetermined preheating temperature, stopping the cooling means; and
7) dismounting the mandrel.

This entirely novel and original "dual" winding method in which both a reinforcing fiber fabric and a sheet of matrix material are wound simultaneously on a common mandrel makes it possible to associate materials that cannot be mixed together by the conventional "mono" winding method. It makes it possible to obtain composite materials having a two-dimensional structure which presents high mechanical characteristics. In a particular variant implementation, the mandrel may constitute a preform for the composite material in which case it forms a part integral therewith.

The reinforcing fiber fabric comprises a woven structure of bare fibers and a polymer that is added by preimpregnation. The fibers may be constituted by fibers of carbon, of polyparaphenyleneterephthalamide known under the name "Kevlar", of glass, or of bronze, or by a mixture of such fibers. The polymer preferably comprises PTFE or PTFCE or any other thermosetting polymer.

The sheet of matrix material comprises the polymer and at least one additive for improving the tribological and heat conductivity characteristics of the material. The additive may advantageously be constituted by a molybdenum bisulfide ($MoS_2$), a silicon carbide (SiC), a graphite, silver, or lead.

The method of the invention makes it possible to obtain compositions having a wide range of reinforcement/matrix/additive ratios and thus having characteristics, and in particular tribological characteristics, that are particularly advantageous, such as excellent wear resistance and a low coefficient of friction.

Advantageously, the mandrel is cooled by air circulation and preferably, in order to avoid any transfer between the polymer and the heating means, heating is performed without contact by using infrared heating around a welding zone between the reinforcing fabric and the sheet of matrix material. Nevertheless, heating of the composite material may be reinforced by previously heating the reinforcing fiber fabric and/or the sheet of matrix material upstream from the welding zone. The welding zone preferably extends over an angle of 45°.

In order to obtain maximum adhesion between the successive strata making up the composite material, the mandrel is preheated in an oven before being used.

In a variant implementation of the method, the mandrel is preheated directly by the infrared heating means, thereby avoiding the need to use an auxiliary oven, but then requiring rotation of the mandrel to be interrupted in order to fix on the fabric and the sheet.

The present invention also provides a machine for manufacturing a composite material in the form of an annular tube by winding both a reinforcing fiber fabric and a sheet of matrix material on a mandrel, the machine comprising a load-carrying structure provided with two uprights between which the mandrel is placed to be rotated by drive means, the machine including means for combined fixing of the reinforcing fiber fabric and of the sheet of matrix material on the mandrel, tensioning means for tensioning said fabric and sheet while they are being simultaneously wound on the mandrel, and heating means for heating the composite material obtained in this way and disposed in a welding zone between the reinforcing fiber fabric and the sheet of matrix material. Advantageously, the heating means are implemented by a contact-less infrared device.

The mandrel includes a slot extending substantially along its entire length for receiving the free ends of the reinforcing fiber fabric and of the sheet of matrix material. Fixing to the mandrel then occurs naturally after one or two revolutions, after which the fabric and the sheet are subjected to their nominal operating tension. In addition, the mandrel is pierced by channels to enable a cooling fluid to circulate.

Preferably, the heating means are moved as a function of the increasing diameter of the tube of composite material by means of a pantograph assembly so that the distance between the heating means and the tube remains constant.

Adhesion between the successive strata of the composite material may be increased by using preheating means disposed upstream from the welding zone and optionally by using a presser device disposed downstream from the welding zone.

Finally, the invention relates to a composite material made in application of the above-described method by using the above-specified machine to wind simultaneously both a reinforcing fiber fabric made up of bare fibers impregnated with a polymer and a sheet of matrix material constituted by the same polymer and filled with a determined additive. The fibers are selected from fibers of the group comprising fibers made of carbon, of "Kevlar", of glass, and of bronze, and a mixture of such fibers, the polymer comprises PTFE or PTFCE or any other thermosetting polymer, and the additive is selected from the substances of the group comprising molybdenum bisulfide, silicon carbide, graphite, silver, and lead. By simultaneously winding the reinforcing fiber fabric and the sheet of matrix material, the sheet of matrix material alternates with the reinforcing fiber fabric in the resulting tubular structure.

BRIEF DESCRIPTION OF THE DRAWINGS

Other characteristics and advantages of the present invention appear more clearly from the following description given by way of non-limiting indication and made with reference to the accompanying drawings, in which:

FIG. 4 is a section on IV—IV of FIG. 3.

MORE DETAILED DESCRIPTION

Figures 1, 2:
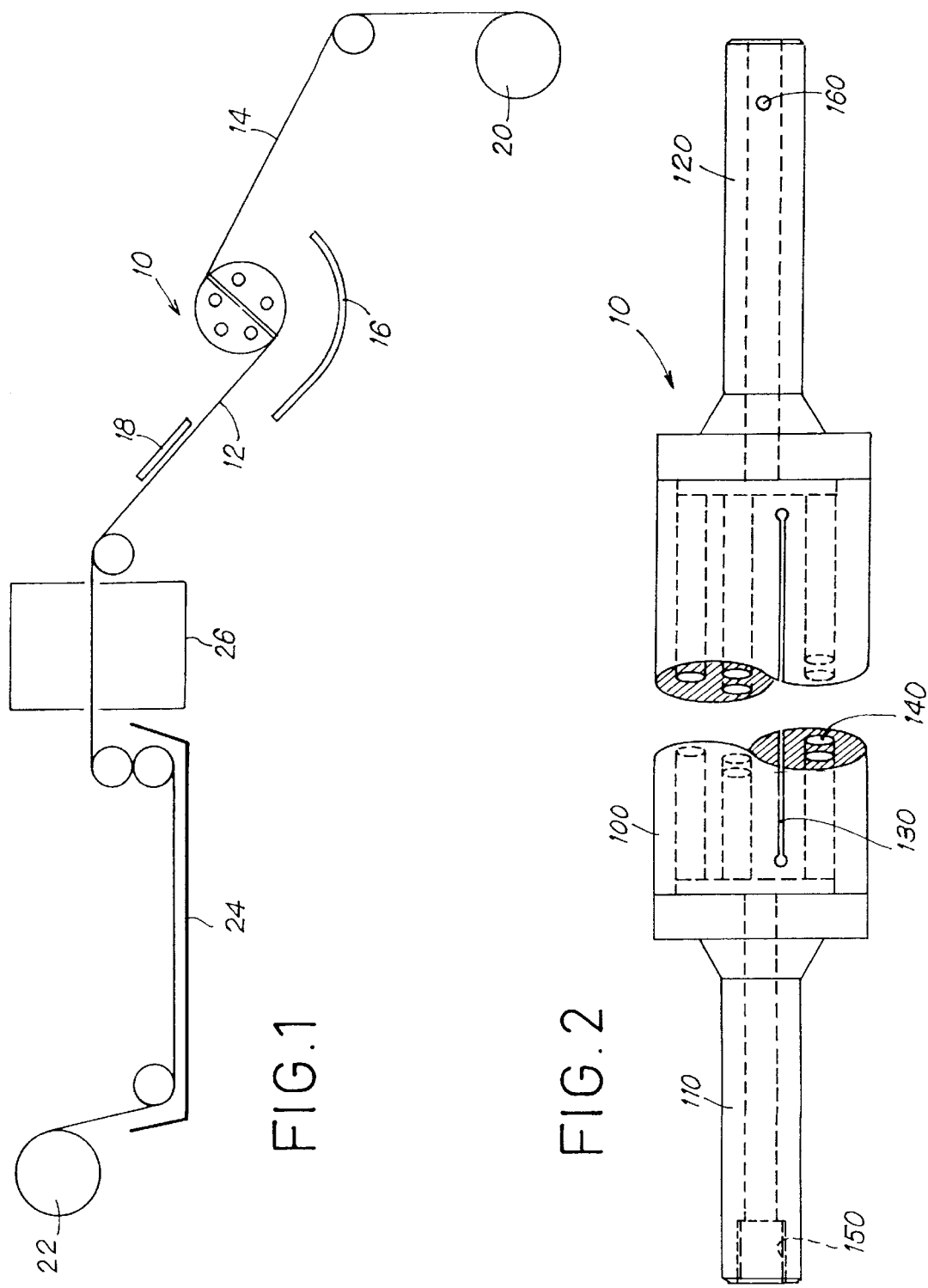
FIG. 1 is a diagram showing the method of the invention for manufacturing a composite material.
FIG. 2 shows the mandrel used in the method of the invention.

The bearings or bearing cages or other analogous products (gaskets, journal bearings, or inserts, for example) are obtained by cutting up a tube of composite material whose method of manufacture in accordance with the invention is shown highly diagrammatically in FIG. 1. It is organized around a mandrel 10 onto which there are wound both a first strip 12 having a width substantially equal to the length of the mandrel and constituted by a reinforcing fabric made of fibers of carbon, "Kevlar", glass, or bronze, or a mixture of such fibers that has previously been impregnated with a polymer such as PTFE for example, and a second strip 14 having the same width and constituted by a sheet of matrix material formed by a polymer such as PTFE or PTFCE which may be filled with antiwear additives, with lubricants, or with any other substance suitable for improving the properties of the material, e.g. its heat conductivity. During the simultaneous winding of the reinforcing fabric and of the sheet of matrix material, and optionally previously thereto, the fabric 12 and the sheet 14 are heated by infrared contact-less heating means 16 and 18 while the mandrel 10 is simultaneously cooled. The heating wavelength is determined for best absorption by the selected polymer.

The operations enabling the reinforcing fabric and the sheet of matrix material to be obtained comprise conventional methods. Thus, the sheet of matrix material may be made from a plate obtained by sintering a powder and hot rolling, the sheet then being wound onto a first cylinder 20 from which it can subsequently be paid out to perform the method of the invention and which is described in greater detail below. The powders used are of the polymer type and may be filled with various additives likewise dispersed in powder form.

Similarly, the reinforcing fabric may be obtained by impregnating a bare fiber fabric paid out from a second cylinder 22 into a basin 24 containing in solution a suspension of the polymer in question, e.g. PTFE. Passing through an oven 26 then achieves the evaporation necessary for obtaining a fabric 12.

Another implementation of the reinforcing fabric consists in precoating the fabric in a multi-pass coating tower. In this case the operation cannot follow winding but it enables a large width of fabric to be coated which then needs to be cut up in order to be capable of being wound.

These impregnation operations are intended to prepare bonding between the reinforcing fiber and the matrix by adding a limited and determined amount of matrix material.

Figure 3:
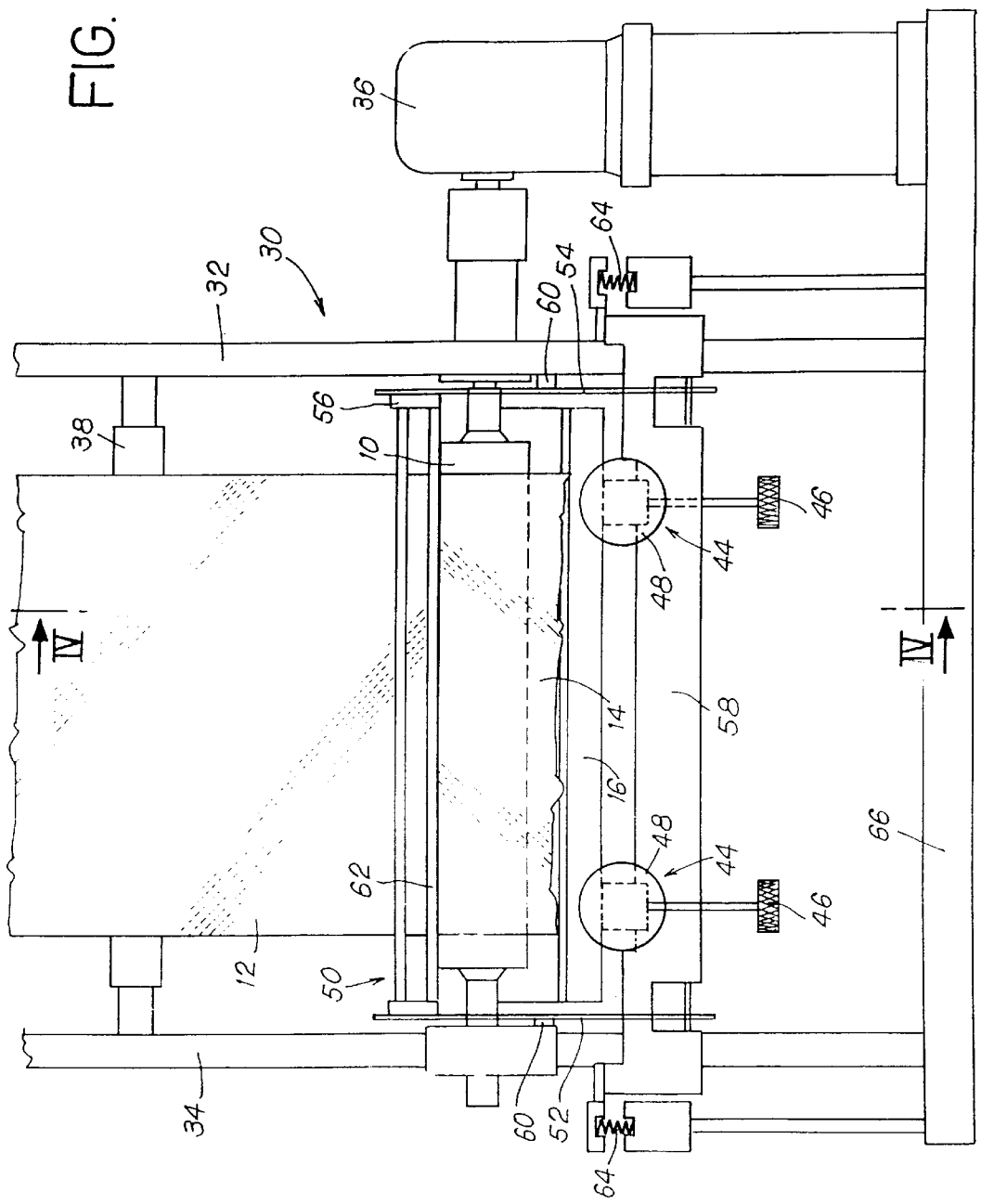
FIG. 3 is an outside view of the machine on which the manufacturing method of the invention is implemented.

FIG. 2 shows in detail the structure of the FIG. 1 mandrel that enables the Reinforcing fabric and the matrix sheet to be would simultaneously. The mandrel 10 comprises a cylindrical body 100 (although this shape is not essential, and oblong, multi-lobed, or polygonal shape being equally possible) having first and second ends 110 and 120. A slot 130 passes right through the body 100 over a major fraction of its length for the purpose of receiving the free ends of the reinforcing fabric and the sheet of matrix material so as to fix them to the mandrel. This solution for fixing the fabric and the sheet to the mandrel is naturally not the only solution possible, even if it is preferred. It would also be possible to implement a solution involving screws for tightening removable sectors. Channels 140 are pierced through the mandrel parallel to its axis of rotation to enable it to be cooled by conveying a cooling fluid, which fluid is advantageously air, although it would also be possible to establish circulation of water or of any other liquid, the fluid circulating from an inlet orifice 150 formed at one end of the mandrel, e.g. 110, and flowing towards an outlet orifice 160 formed at the other end. The mandrel is rotated by any appropriate means, in particular electrically driven means as shown in FIG. 3 which shows a machine that is particularly adapted to making composite tubes by dual winding in application of the method of the invention.

The machine mainly comprises a load-bearing structure 30 having two uprights 32 and 34 in which the two ends of the mandrel 10 are engaged, which mandrel is rotated at constant speed from one of its ends by a motor unit 36 (the cooling liquid or gas admission device (not shown) then advantageously being placed at the other end of the mandrel). In order to bring the composite material in the welding zone to the required temperature for bonding the reinforcing fiber and the matrix, the constant temperature contact-less heating means 16 are constituted by one or more infrared tubes 42 disposed along the entire length of the mandrel (although it could also be possible to perform heating by contact and using resistance elements). The heating device is supported on supports 44 that are adjustable in height and in depth, e.g. by screw assemblies with knurled knobs 46, 48. Tension rollers disposed between the uprights, e.g. 38, 40, or any other analogous device, serve to maintain constant tension on the reinforcing fabric and on the sheet of matrix material in order to guarantee sufficient pressure between the various strata of the composite material. It may be observed that this tension could also be obtained by applying braking to the payout cylinders 20 and 22, in particular electromagnetically. Additionally, a presser device at the outlet from the welding zone may act to increase the pressure between strata and as a subsidiary feature to provide cooling.

In an advantageous embodiment making it possible to track the change in diameter of the tube being manufactured accurately, the supports may be moved by a pantograph assembly 50. The assembly comprises two arms 52 and 54 disposed in a plane perpendicular to the longitudinal axis of the mandrel 10 and substantially level with its two ends, the arms being constituted by rods hinged about a fixed point 60 secured to the uprights 32 and 34. The top portion of each of these arms is connected to a feeler device 56 while its bottom portion engages a holding device 58 for resiliently holding supports 44 for the heating means 16. The feeler device advantageously comprises at least one bar 62 resting on the entire length of the mandrel and moved with increasing diameter of the tube, thereby displacing the bottom portions of the arms in the opposite direction (relative to the fixed point 60) thus automatically lowering the holding device 58 (and thus the supports 44) on which the arms rest and which is connected by resilient means 64 to the base plate 66 supporting the load carrying structure of the machine. By using such a pantograph assembly, it is possible to guarantee that a constant distance is maintained between the heating means and the surface of the tube, regardless of its diameter. Thus, the radiated flux per unit area is substantially constant and adhesion between strata and also uniformity of the composite material are improved.

The manufacturing method implemented in the above-described machine makes a tube of said material by simultaneously winding (dual winding) both a reinforcing fiber fabric and a sheet of matrix material, both being of a width substantially equal to the length of the mandrel. The feedstocks are previously obtained by conventional methods. The method itself comprises the following steps:

1) preheating the mandrel to a predetermined temperature;
2) fixing the reinforcing fiber fabric and the sheet of matrix material to the mandrel;
3) causing the mandrel to rotate at a nominal speed, the fabric and the sheet being subjected to a determined tension lower than a nominal tension;
4) actuating heating means for heating the material and cooling means for cooling the mandrel;
5) after a determined number of revolutions of the mandrel, placing the fabric and the sheet under nominal tension;
6) when the tube reaches the desired diameter, stopping both the heating means and the rotation of the mandrel;
7) after a determined length of time sufficient for bringing the temperature of the mandrel to the predetermined preheating temperature, stopping the cooling means; and
8) dismounting the mandrel and if necessary extracting the tube.

The step of preheating the mandrel, which is essential for ensuring good adhesion between strata, may be performed independently in an oven or directly on the machine by using the heating means. In the first case, it is necessary to interrupt said heating for a few instants in order to fix the fabric and the sheet on the mandrel. The adhesion can be further improved, in particular for tubes of large diameter and when using certain particular fibers such as bronze fibers for example, by preheating the reinforcing fiber fabric upstream from the welding zone (by using the means 18). It may be observed that such preheating may also apply to the sheet of matrix material. The purpose of applying the lower tension, e.g. at 10% of its nominal value, to the feedstocks during the first few revolutions of the mandrel, and in practice the first two or three turns, is to prevent them escaping from the slot in the mandrel in which they have been placed in the preceding fixing step. Nevertheless, if fixing is performed differently, in particular by screw tightening, then this precaution is no longer necessary and nominal tension may be applied from the first revolution of the reinforcing fabric and of the sheet of matrix material, in which step 5) becomes pointless.

Extraction of the mandrel from the tube causes the ends of the fabric and of the sheet inserted in the fixing slot to shear, so it is then necessary to machine the inside of the composite material tube prior to cutting it up for use. It may nevertheless be observed that such extraction need not be performed when the mandrel constitutes a preform forming an integral portion of the final material.

Tests have been performed by using the above-described method for making a composite material having high mechanical and tribological characteristics with a volume ratio of matrix to reinforcing fiber of 6 and with low densities. It has thus been possible to observe circumferential and axial traction limits greater than 140 Pa for a tube comprising 40% glass fiber and 60% PTFE, with the limit rising to 200 Pa for a tube comprising 15% carbon fiber and 85% PTFE. With the latter type of material, the parallel and orthogonal coefficients of friction (relative to the fibers) on a stainless steel were respectively less than 0.05 and less than 0.15.

Using the method of the invention, it is possible to obtain a material having a very low reinforcing fiber content of about 10%, and a correspondingly high polymer content of close to 90%. The ratios of reinforcement to matrix to additive in the composition can be modified over wide ranges thus enabling the material to be optimized. In addition, and above all, this dual winding method makes it possible to associate the reinforcing fiber fabric with materials that, a priori, are not miscible therewith, such as lead, silver, graphite, or molybdenum bisulfide ($MOS_2$), but which are, on the contrary, very easily integrated in a PTFE matrix.

A composite material having a PTFE matrix filled with $MoS_2$ and carbon fiber reinforcement impregnated with PTFE has been made under the following conditions:

preheating of the mandrel to about 200° C.;

speed of rotation of the mandrel in the range 0.1 revolution per minute (rpm) to 0.5 rpm depending on the diameter of the tube;

tension of the reinforcing fabric 50 N/cm to 200 N/cm;

tension of the matrix sheet 1 N/cm to 10 N/cm heating temperature about 700° C. (for a surface temperature on the tube greater than 380° C.); and heating over an angular zone of about 45°.

The surface temperature of the tube must be high enough to cause the polymer to melt but not too high so as to avoid degrading it, and the tension of the reinforcing fabric must not exceed the limit imposed by the mechanical strength of the fiber, particularly in the welding zone.

Because of its exceptional mechanical and tribological characteristics, the material that results from the method of the invention for obtaining tubes by dual winding is particularly suitable for making bearing cages that operate at low temperature or cages that cannot be lubricated such as those used in gyroscopes. The material is also suitable for use in the landing areas of industrial machines that use active magnetic bearings, without this field being limiting in any way.

What is claimed is:

1. A tubular structure of a composite material comprising:
   a simultaneous winding comprising:
      a reinforcing fiber fabric comprising bare fibers impregnated with a thermosetting polymer, and
      a sheet of a matrix material, alternating with the reinforcing fiber fabric, comprising said polymer and filled with a determined additive suitable for improving tribological and heat conductivity characteristics of the composite material; the reinforcing fiber fabric and the sheet of matrix material each having first ends and second ends, the first ends located in the interior of the winding, the second ends radially outwardly displaced from the first ends.

2. A tubular structure of a composite material according to claim 1, wherein the fibers are selected from the group of fibers made of carbon, of polyparapheneyleneterephthalamide, of glass, of bronze, and of a mixture of such fibers.

3. A tubular structure of a composite material according to claim 1, wherein the polymer includes PTFE or PTFCE.

4. A tubular structure of a composite material according to claim 1, wherein the additive is selected from the group comprising molybdenum bisulfide, silicon carbide, graphite, silver, and lead.

5. A tubular structure of a composite material according to claim 1, wherein the determined additive comprises an antiwear additive or a lubricant.

6. A tubular structure formed of a composite material, the tubular structure comprising:
   a first winding comprising a reinforcing fiber fabric comprising bare fibers impregnated with a thermosetting polymer; and
   a second winding, alternating with the first winding comprising a sheet of a matrix material comprising said thermosetting polymer and filled with a determined additive suitable for improving tribological and heat conductivity characteristics of the composite material;
   the first winding and the second winding having first ends and second ends, the first ends located in the interior of the tubular structure, the second ends radially outwardly displaced from the first ends.

7. A tubular structure according to claim 6, wherein the fibers comprise carbon, polyparapheneyleneterephthalamide, glass, bronze, or a mixture of carbon, polyparapheneyleneterephthalamide, glass, and bronze.

8. A tubular structure according to claim 6, wherein the thermosetting polymer includes PTFE or PTFCE.

9. A tubular structure according to claim 6, wherein the additive comprises molybdenum bisulfide, silicon carbide, graphite, silver, or lead.

10. A tubular structure according to claim 6, wherein the determined additive comprises an antiwear additive or a lubricant.

* * * * *

UNITED STATES PATENT AND TRADEMARK OFFICE
CERTIFICATE OF CORRECTION

PATENT NO.    : 6,228,444 B1
DATED         : May 8, 2001
INVENTOR(S)   : Peter Wolki et al.

It is certified that error appears in the above-identified patent and that said Letters Patent is hereby corrected as shown below:

<u>Column 4,</u>
Line 46, "Reinforcing fabric" should read -- reinforcing fabric --; and <u>Column 6,</u>
Line 64, "(MOS$_2$)" should read -- MoS$_2$ --.

Signed and Sealed this

Twenty-fourth Day of December, 2002

JAMES E. ROGAN
*Director of the United States Patent and Trademark Office*